Dec. 11, 1928.
J. C. MacILDOWIE
1,695,253
PROCESS FOR FINISHING THE SURFACES OF BONDED ASBESTOS
AND THE LIKE AND RESULTING PRODUCT
Filed March 24, 1925
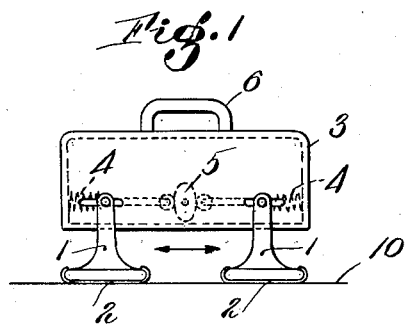
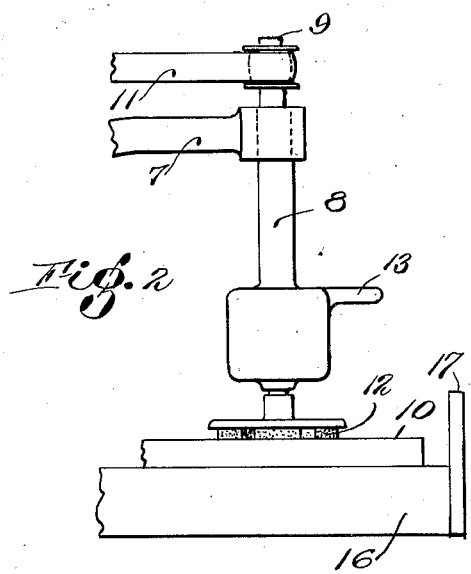
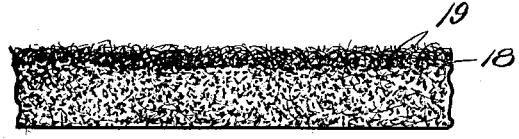
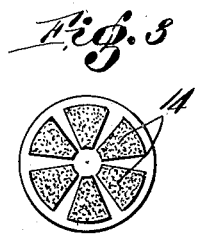
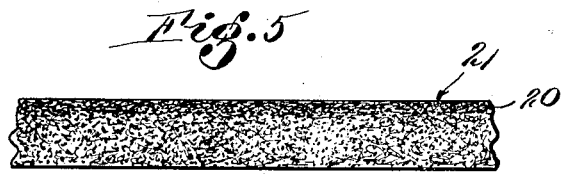
Inventor:
John C. MacIldowie,
by Roberts, Roberts & Cushman
Attys.

Patented Dec. 11, 1928.

1,695,253

UNITED STATES PATENT OFFICE.

JOHN C. MacILDOWIE, OF NASHUA, NEW HAMPSHIRE, ASSIGNOR TO ASBESTOS WOOD & SHINGLE CO., OF NASHUA, NEW HAMPSHIRE, A CORPORATION OF NEW HAMPSHIRE.

PROCESS FOR FINISHING THE SURFACES OF BONDED ASBESTOS AND THE LIKE AND RESULTING PRODUCT.

Application filed March 24, 1925. Serial No. 17,951.

The present invention relates to a process for providing a finished, polished surface upon cement bonded fibrous materials, such as asbestos board and the like, and to the product resulting from the operation of the process.

It is well known that materials, which are composed of comminuted material bonded with hydraulic or other cement, usually possess a dull, rough, surface and that it is quite impossible without the application of some varnish-like substances to impart any luster thereto or even make it smooth. Moreover the surfaces of such materials are ordinarily porous, and persist in this condition, and unless coated with some impregnating fluid such as paint, there is no practicable or convenient method of making it dense or repellent, for example, to the penetration and retention of moisture and other finely divided substances such as dust. But in many cases, fluid coatings may be quite undesirable, especially when the specific qualities of the material itself are of particular importance, and usually the fluid or semi-fluid binders which may be used do not permanently retain a high polish.

As representative of this general category of materials, asbestos board may be cited as an example. This product is used largely for the construction of electrical switchboards or the like, where high voltages are employed and where the dielectric strength and other electrical and physical properties of both the surface and the body portion of each element are of critical importance. Hence, painting or otherwise coating the surface is entirely inappropriate, while at the same time the presentation of a porous surface to the absorption of atmospheric moisture may be equally hazardous as well as unsatisfactory on account of the accumulation of dust and dirt, not easily removed.

It is an object of this invention to provide a process for imparting a finished, polished surface to bonded materials, such as bonded asbestos without altering the composition of either the surface or body portions thereof and without deleteriously affecting the desirable physical characteristics such as electrical resistance, refractoriness, chemical inertness, strength, etc., which it may possess.

In its general aspect, the invention consists in a process whereby the interstices between particles at and near the surface of such material are filled and densely packed with very finely comminuted particles of substance identical with that of which the material is composed, while at the same time the close-grained surface thus formed is polished and rendered substantially continuous and impervious, as evidenced by the direct reflection of light therefrom, as from a mirror.

Preferably these two objects will be simultaneously achieved by converting superficial portions of the bonded material into the finely divided filling material, by grinding and polishing with a liquid, e. g. water or oil, which acts as a lubricant and also as a vehicle for distributing the comminuted filling material and carrying it into the interstices of the body under the operations, which will preferably be continued until the liquid vehicle has substantially disappeared.

A preferred and typical application of the invention will be described in its adaptation to the surfacing of bonded asbestos board, and with reference to the accompanying drawings, in which—

Fig. 1 is a diagrammatic representation of an appropriate sandpapering device;

Fig. 2 is a side view of a sheet of asbestos board and of the polishing wheel in position thereon for operation;

Fig. 3 is a plan view of a segmental wheel;

Fig. 4 is an enlarged cross section of an unfinished sheet of asbestos; and

Fig. 5 is an enlarged cross section of a finished sheet.

Referring to Fig. 1, the sandpapering device or "sander" consists of a pair of arms 1, adapted to hold sheets of sand paper 2 on the under surface thereof and mounted in a frame or casing 3 for transverse motion toward and away from each other under the mutual actuation of springs 4 and a cam 5, which may be rotated by a small electric motor, not shown, or other suitable means. A handle 6 is provided for manual control of the device while in use.

The polishing wheel, as shown in operation upon the sheet 10 (Fig. 2) comprises a universally mounted supporting arm 7 in the end of which is mounted a vertical counterpoised sleeve 8 provided with a handle 13 and carrying a vertical shaft 9 driven by a belt 11.

On the lower end of the shaft, a suitable mounting 11, is provided for receiving a segmental wheel 12 (as shown more fully by Fig. 3) consisting of a plurality of sectors 14 spaced apart, as in the form of a broken ring, and mounted with their flat surfaces in substantially the same plane. The plane surface thus presented is adapted to contact with the upper surface of sheet 10 which is held in position by support 16 in the frame 17.

Referring to Fig. 4, an exaggerated cross section of sheet 10 is shown as it appears before treating in accordance with the invention, presenting a rough surface 18 and projecting fibrous ends 19. Fig. 5 illustrates the character of the sheet after treatment, showing the consolidated surface portion 20 and the smooth level surface 21.

The asbestos board, for example such as made in accordance with the process described by Charles L. Norton, in Patent No. 929,004, issued July 27, 1909, which is representative of the procedure commonly employed, for this purpose, is composed of shredded asbestos fibres which are mixed with a finely divided cementitious substance such as Portland cement and water. The mixture is made up to a convenient consistency and pressed into molds of the desired shape, (usually relatively thick sheets) under heavy hydraulic pressure, provision being made for the uniform escape of water from the various portions of the mold. The sheet, as thus formed may be repressed and, after keeping it moist for a suitable period to permit an incipient setting of the bond to take place, it is allowed to dry, or is dried by direct contact with a current of dry, hot air or the like.

While the foregoing treatment obviously may be varied, an essential ingredient is that the bonding element, of whatever nature it may consist, shall be set to a sufficient degree to retain the granular or fibrous element, namely the asbestos and any other material which may be incorporated therewith, firmly embedded therein and also to acquire a fair degree of rigidity in its own structural make up, thus presenting a relatively hard and uniform surface, though not altogether even and somewhat porous and dull as to color.

The sheet as thus obtained is placed upon a firm bed such as the support 16, and most conveniently, in a horizontal position with the surface to be treated uppermost.

If large irregularities occur in the surface of the sheet to be finished, it is well not to depend upon removing them by the subsequent operation, but to abrade them off by means of short quick passes of a sheet of fine emery paper over them. This is most effectively accomplished with the sander device above described by passing it lightly or heavily, as required, over the rough spots and reducing them to a relatively flat surface.

A coating of water is then applied to this surface a part penetrating the pore spaces and part remaining unabsorbed, an amount sufficient, for example, to make the surface glisten.

Without permitting prolonged absorption, the wheel 12 is started to rotate and then lowered gently, by manipulation of the handle 13, into flat contact with the wet surface of the sheet. It is not permitted to act long in any one place, but is preferably kept in constant motion and directed uniformly back and forth over the entire surface of the sheet, by means of the supporting bracket 7 and handle 13. Meanwhile, additional water is permitted to drip upon the surface to replace that which is absorbed by the sheet or evaporated.

A small proportion of the surface fibres is removed by this treatment which accumulates in small balls and is thrown off by the rotation of the wheel. But the removal of such fibres is to be attributed to their extremely loose attachment to the sheet rather than to a tearing action of the wheel, for there is no detachment of fibres sufficiently embedded to leave depressions or observable pits in the surface.

An emulsion or thick fluid suspension composed of water and fine particles from the sheet gradually forms, upon the continued action of the wheel, which is not great in volume but which facilitates the continued operation of the process. The supply of additional water is next cut off, but the wheeling operation is continued. The emulsion referred to is gradually consolidated with the surface of the sheet which loses its appearance of free moisture and develops a fine, dense, smooth surface. Upon continued operation this is transformed into a glossy sheen or highly polished reflecting surface of dense structure and apparent homogeneity.

If any markings, as from irregular operation of the wheel, are apparent at this stage they may be removed by the continued operation of the wheel, but it is feasible, and usually more convenient and satisfactory to sand paper them off by the short, rapid, oscillations of the "sander" device which has been described above. The surface will be found sufficiently hard to resist any serious scratching, though if delayed the surface apparently acquires an additional hardening so that sanding of such places at a later time is difficult and not entirely satisfactory in the results which may be accomplished.

The surface thus produced is substantially a perfect plane and presents a highly reflecting polish. It is less porous than the unfinished surface but permits impregnation as with asphalt and the various other dielectric fluids generally used for this purpose. The surface portion is nevertheless of a relatively dense structure whether impregnated or not, and is not susceptible to any appreciable absorption or retention of moisture and is obviously little affected by frictional wear and the accumulation of dust, while at the same time the polished surface permits ready and complete removal of whatever may collect upon it.

It is especially to be observed that while a high polish and a harder and more dense surface has been thus imparted to the sheet or other shape of the bonded material, no foreign substance has been added thereto either on the surface or in the interstices. Neither have the projecting points been merely removed and polished, leaving pits and hollows therebetween as ordinarily occurs when such substances are finished by other processes, but the whole surface is metamorphosed and consolidated and amalgamated into a continuous and homogeneous plane, the variations of which are comparable only to the wave lengths of light, as demonstrated by the fact that such surfaces reflect clearly defined images, a result not hitherto attainable upon materials of this character by any treatment of which I am aware.

The wheel, alluded to above is of the segmental type and adapted to be mounted with its flat surfaces exposed for application to the work, is preferably smooth, fine grained and dense of structure and possessed of a high degree of hardness. A natural stone, such as those ordinarily used for making hones may be employed, but it is found that artificially bonded abrasives are entirely satisfactory for this purpose. For example, electrically fused alumina, crushed to pass a screen having 200 meshes to the linear inch, mixed with shellac, molded and heated to a sufficient temperature to soften and coalesce the mass into an integral structure, upon cooling and hardening produces a wheel of suitable structure, hardness, and uniformity both as to surface and as to the modifications which it undergoes during use.

It is also noteworthy that, in the final stage, or polishing operation of the process, the sander may have its sand paper surface substituted by a sheet of flexible steel. For example a saw blade has been successively employed for the purpose,—the sander then being passed over the already polished surface in the same manner as when sand paper is employed. This may be done with or without the addition of a small quantity of oil, (preferably of low viscosity and surface tension) as desired. In either case the polished surface is additionally burnished, yielding an especially high degree of lustre or gloss. The oil also tends to increase the already dense surface produced by the preceding treatment, if used, but it is not essential to the desirable results of this operation.

While the invention has been described in its specific application to the finishing of asbestos board, such as that prepared for use in switch boards and the like, it will be clear that it may also be conducted upon various other materials, that may be chosen by analogy of composition or construction or other comparable characteristics, and that the steps and degree of the procedure may be modified accordingly. It is also probable that the described results may be obtained by applying a finely divided mixture of constituents of the sheet to the surface to be treated, derived from an extraneous source instead of from that naturally occurring in the surface itself during the operation of the process. Such other adaptations and modifications of the invention, however, are to be understood as comprehended by the present disclosure and in the following claims.

I claim:

1. A bonded material comprising asbestos and a cementitious bond having a consolidated outer layer of the same reduced to a substantially light reflective surface.

2. A bonded material comprising asbestos and a cementitious bond, having an outer layer of the same consolidated in situ and bounded by a substantially planar surface.

3. A bonded material comprising asbestos and a cementitious bond having an outer layer consolidated in situ and bounded by a substantially planar surface, and a thin coating of oil thereon.

4. A bonded material comprising asbestos and a cementitious bond, having an outer layer of the same, metamorphosed in situ to a more dense and consolidated structure than the body portion.

5. A bonded material comprising asbestos and a cementitious bond, having an outer layer of the same composition, consolidated in situ and bounded by a substantially planar surface, said surface having the characteristic property of reflecting light.

6. A method of finishing the surface of cement-bonded asbestos material, which comprises filling and packing the interstices between the particles at or near said surface with very finely comminuted particles, identical in composition with the cement-bonded asbestos surface, and polishing the close grained surface thus produced.

7. A method of finishing the surface of cement-bonded asbestos material, which comprises grinding the same with a liquid vehicle, thereby converting the superficial portions of the surface material into a finely divided filling material, compacting the filling material into the interstices between the particles of cement-bonded asbestos at and near the surface and polishing the thus consolidated surface material.

8. A method of finishing the surface of cement-bonded asbestos material, which comprises simultaneously grinding and polishing the same with a liquid vehicle, thereby converting the superficial portions of the surface material into a finely divided filling material, compacting the filling material into the interstices between the particles of cement-bonded asbestos at and near the surface, reducing the thus consolidated surface material to a plane surface, and continuing the operation until the liquid vehicle is absorbed and a light reflecting gloss is produced.

9. A method of preparing polished surfaces of cement-bonded asbestos, which comprises molding a wet mixture of an hydraulic cement and asbestos fiber into the desired shape, permitting the cementitious bond to partially set and, while the bond still retains some of its inherent capacity to set, filling and packing the interstices between the particles at and near the surface with finely comminuted particles substantially identical in composition and integral with the cement-bonded asbestos surface, and polishing the close grained surface thus produced.

10. A method of preparing polished surfaces of cement-bonded asbestos, which comprises molding a wet mixture of an hydraulic cement and asbestos fiber into the desired shape, permitting the cementitious bond to partially set and, while the bond still retains some of its inherent capacity to set, filling and packing the interstices between the particles at and near the surface with finely comminuted particles substantially identical in composition and integral with the cement-bonded asbestos surface, polishing the close-bonded asbestos surface, polishing the close grained surface thus produced and finally effecting complete and integral setting of the entire bonded mass.

11. A cement-bonded asbestos article, characterized by containing asbestos fibers bonded together by cement, the interstices between the particles at or near the surface of said article being packed with a finely divided filling substance identical in composition with the cement bonded portion of the article and integrally united therewith, the composite surface of said cement-bonded particles and said filling substance being characterized by a light reflective polish.

Signed by me at Nashua, N. H., this nineteenth day of March, 1925.

JOHN C. MacILDOWIE.